United States Patent
Miyazaki

[11] Patent Number: 5,975,510
[45] Date of Patent: Nov. 2, 1999

[54] DAMPING APPARATUS

[75] Inventor: Toshihiro Miyazaki, Kodaira, Japan

[73] Assignee: Bridgestone Corporation, Tokyo, Japan

[21] Appl. No.: 08/864,399

[22] Filed: May 28, 1997

[30] Foreign Application Priority Data

Jun. 6, 1996 [JP] Japan .................................. 8-144232

[51] Int. Cl.⁶ ...................................................... F16F 5/00
[52] U.S. Cl. .................................. 267/140.15; 267/141.1; 248/550
[58] Field of Search ............................. 267/141.1, 141.2, 267/140.14, 140.15 OR, 136, 140.11; 248/550, 632; 188/180, 267, 378, 379

[56] References Cited

U.S. PATENT DOCUMENTS

| | | | |
|---|---|---|---|
| 3,529,188 | 9/1970 | Gearing | 73/652 |
| 4,624,435 | 11/1986 | Freudenberg | 267/140.14 |
| 4,869,474 | 9/1989 | Best et al. | 188/379 |
| 4,976,415 | 12/1990 | Murai et al. | 267/136 |
| 5,121,898 | 6/1992 | Yasuda et al. | 248/550 |
| 5,249,782 | 10/1993 | Ide et al. | 188/267 |
| 5,427,362 | 6/1995 | Schilling et al. | 267/140.14 |
| 5,520,375 | 5/1996 | Leibach et al. | 267/140.14 |
| 5,529,295 | 6/1996 | Leibach et al. | 267/140.14 |
| 5,693,990 | 12/1997 | Miyazaki | 248/550 |
| 5,765,800 | 6/1998 | Watanbe et al. | 248/550 |

FOREIGN PATENT DOCUMENTS 0-701-314-A3  3/1996  European Pat. Off. .

Primary Examiner—Chris Schwartz
Assistant Examiner—Thomas J. Williams
Attorney, Agent, or Firm—Oliff & Berridge, PLC

[57] ABSTRACT

In a damping apparatus, a magnet section is connected to a vibration-elimination-table mounting frame on the side of a vibration elimination table via layered rubber blocks that are rigid in the axial direction but flexible in directions perpendicular to the axial direction, so that with respect to the mounting frame, the magnet section is supported to be flexible in the direction of force generated by a drive coil but rigid in the directions perpendicular to the direction of the force. The magnet section is supported by a floor mounting frame on the floor side via layered rubber blocks, so that with respect to the floor mounting frame, the magnet section is supported to be rigid in the direction of the force but flexible in directions perpendicular to the direction of the force. Accordingly, an air gap in which a drive coil is disposed can be narrowed, while preventing interference of the drive coil, so that a larger force can be generated in order to damp the vibration elimination table while preventing the magnetic flux density from decreasing. Moreover, the layered rubber blocks shut off vertical vibrations of the floor.

20 Claims, 10 Drawing Sheets

DAMPING APPARATUS

BACKGROUND OF THE INVENTION

1. Field of the Invention

The present invention relates to a damping apparatus suitable for apparatuses—such as electron microscopes, precision optical apparatuses, measurement apparatuses, and precision balances—whose functions are adversely affected by vibrations from foundation, as well as for vibration elimination tables on which the above-described apparatuses are mounted so as to eliminate vibrations.

2. Description of the Related Art

For systems in which a vibrating body (a vibration generating section) supports a body to be vibrated (a vibration reception section), there has been developed an active control method in which a force is actively applied to the body to be vibrated, thereby preventing transmission of vibrations to the body to be vibrated.

An actuator mechanism for such active damping is disclosed in, for example, EP0701314A3.

In the actuator disclosed in EP0701314A3, a current is caused to flow through an electric conductor (drive coil) disposed within an air gap through which lines of magnetic force (magnetic field) pass, so as to generate a force to damp the vibration elimination table.

However, since the electric conductor supported within the air gap is fixed to the main body of the vibration elimination table serving as the vibration reception section, and magnetic-force-line (magnetic field) generation means having the air gap is disposed on a base serving as the vibration generation section, the magnetic-force-line (magnetic field) generation means interferes with the electric conductor if the main body of the vibration elimination table moves with respect to the base in a direction perpendicular to the direction of movement of the electric conductor, resulting in damage to the electric conductor.

The above-described problem may be overcome by widening the air gap. However, if the air gap is widened, the magnetic flux density decreases, and therefore, the efficiency of generation of a force relative to the supplied current decreases.

In addition, when the electric conductor is rigidly supported within the air gap, vibrations are transmitted from the base-side to the vibration-elimination-table side through a mechanism for supporting the electric conductor, resulting in degraded damping performance.

SUMMARY OF THE INVENTION

In view of the foregoing fact, an object of the present invention is to provide a damping apparatus which transmits a force for damping in a predetermined direction to an object whose vibration is to be damped, i.e., a vibration reception section, which allows an electric conductor to be supported within an air gap without fear of interference even when a relative displacement is produced between the vibration generation section and the vibration reception section, and which does not transmit unnecessary vibration from the vibration generation section to the vibration reception section.

According to a first aspect of the present invention, there is provided a damping apparatus which comprises magnetic-force-line (magnetic field) generation means connected to one of a vibration generation section and a vibration reception section and having an air gap through which lines of magnetic force pass in a direction intersecting a predetermined vibration direction; an electric conductor connected to the other of the vibration generation section and the vibration reception section and disposed within the air gap such that when a predetermined current flows through the electric conductor, a force is generated in a direction along the vibration direction; first support means disposed at least between one of the vibration generation section and the vibration reception section and the magnetic-force-line (magnetic field) generation means or between the other of the vibration generation section and the vibration reception section and the electric conductor, the first support means being flexible in directions intersecting the direction of the force but rigid in the direction of the force; and second support means disposed between the electric conductor and the magnetic-force-line (magnetic field) generation means, the second support means being flexible in the direction of the force but rigid in directions intersecting the direction of the force.

In the damping apparatus according to the first embodiment of the present invention, through application of a current to the electric conductor disposed in the air gap of the magnetic-force-line (magnetic field) generation means, a force can be generated in the electric conductor in a direction perpendicular to the flow direction of the current. When such a force is generated in the electric conductor in a direction opposite the direction of vibration of the vibration generation section, the vibration reception section can be damped by the generated force.

Since the first support means, which is flexible in directions intersecting the direction of the force but rigid in the direction of the force, is disposed at least between one of the vibration generation section and the vibration reception section and the magnetic-force-line (magnetic field) generation means or between the other of the vibration generation section and the vibration reception section and the electric conductor, vibrations in the directions intersecting the direction of the force of the vibration generation section can be prevented from transmitting to the vibration reception section. In addition, the force generated in the electric conductor can be efficiently transmitted to the vibration reception section.

Since the electric conductor is supported by the magnetic-force-line (magnetic field) generation means via the second support means having a characteristic such that it is flexible in the direction of the force but rigid in directions intersecting the direction of the force, the electric conductor can be supported at a predetermined position within the air gap such that it can easily move in the direction of the force and is prevented from contacting the magnetic-force-line (magnetic field) generation means.

Moreover, since the electric conductor is supported by the magnetic-force-line (magnetic field) generation means via the second support means which is rigid in the direction intersecting the direction of the force, the distance between the electric conductor and the magnetic-force-line (magnetic field) generation means can be decreased by narrowing the air gap. Accordingly, the magnetic flux density can be increased in order to increase the efficiency of generation of the force with respect to the current supplied to the electric conductor.

According to a second aspect of the present invention, in the damping apparatus of the first aspect, each of the first and second support means includes a layered body composed of elastic material layers and rigid material layers alternately layered.

In the damping apparatus according to the second aspect, since each of the first and second support means is a layered body composed of elastic material layers and rigid material layers alternately layered, the first and second support means each can be rigid in the layering direction and be flexible in directions perpendicular to the layering direction.

Since the damping apparatus of the first aspect of the present invention has the above-described structure, it has an excellent advantage that while the transmission of vibration from the vibration generation section to the vibration receiving portion is prevented, the efficiency of generation of the force with respect to the current supplied to the electric conductor can be improved, so that a larger force can be generated so as to damp the vibration reception section.

In the damping apparatus according to the second aspect of the present invention, since each of the first and second support means is a layered body composed of elastic material layers and rigid material layers alternately layered, movement in the direction of generation of the force can be facilitated, while the rigidity in the direction of vibration transmission can be lowered extremely.

The above and other objects, features and advantages of the present invention will become apparent from the following description and the appended claims, taken in conjunction with the accompanying drawings in which preferred embodiments of the present invention are shown by way of illustrative example.

BRIEF DESCRIPTION OF THE DRAWINGS

The invention will now be described with reference to the accompanying drawings wherein.

DESCRIPTION OF THE PREFERRED EMBODIMENTS

First embodiment:

A damping apparatus according to a first embodiment of the present invention will be described with reference to the drawings.

Figure 1A:
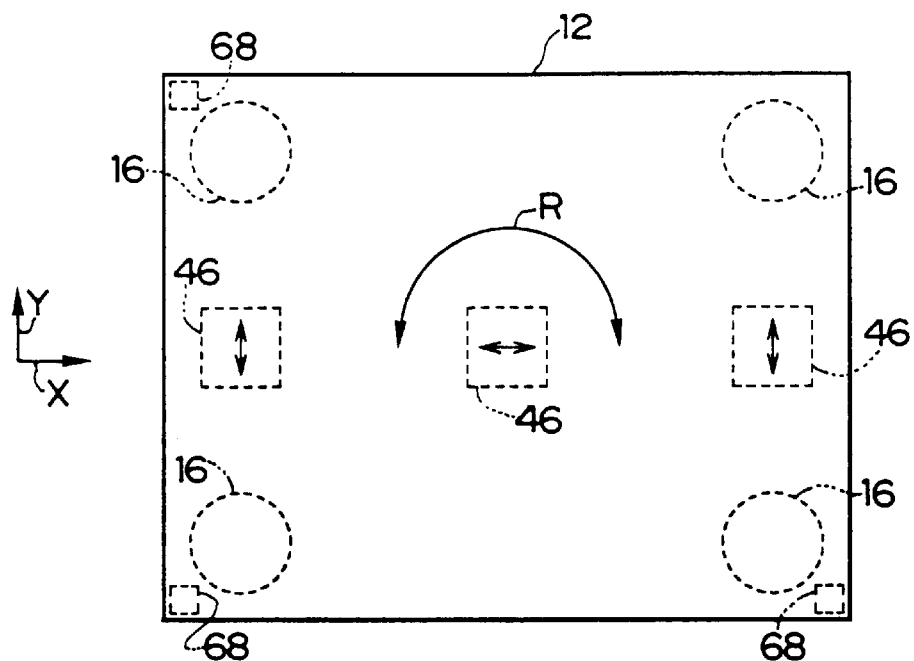
FIG. 1A is a plan view of a vibration elimination table supported by damping apparatuses according to a first embodiment of the present invention.
Figure 1B:
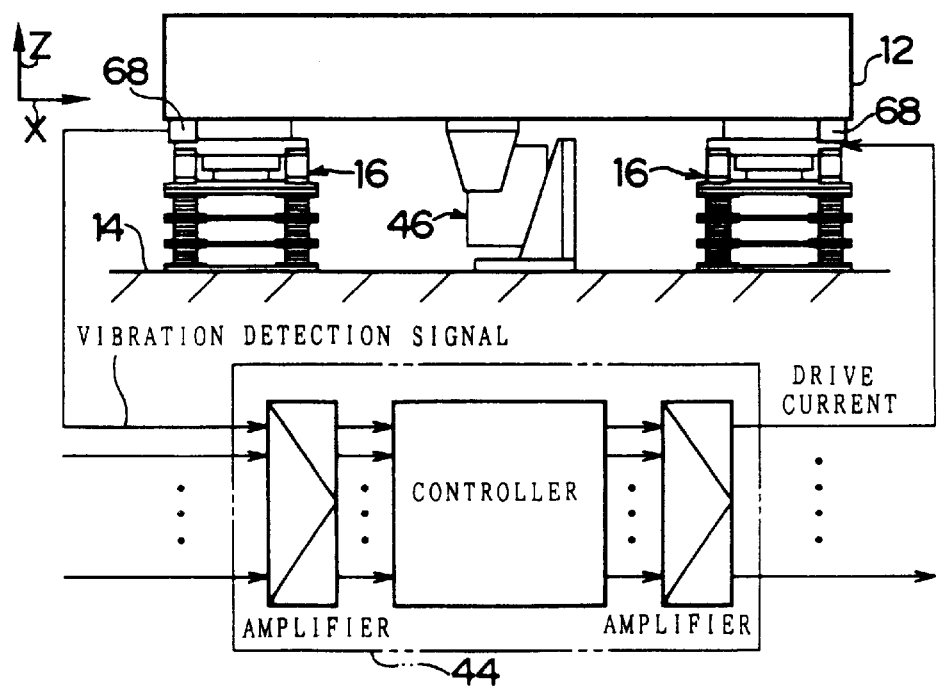
FIG. 1B is a side view of the vibration elimination table of FIG. 1A.

As shown in FIGS. 1A and 1B, a vibration elimination table 12 serving as a vibration reception section is supported by four vertical-direction damping apparatuses 16, each of which is disposed on a floor 14 serving as a vibration generation section.

Figure 2:
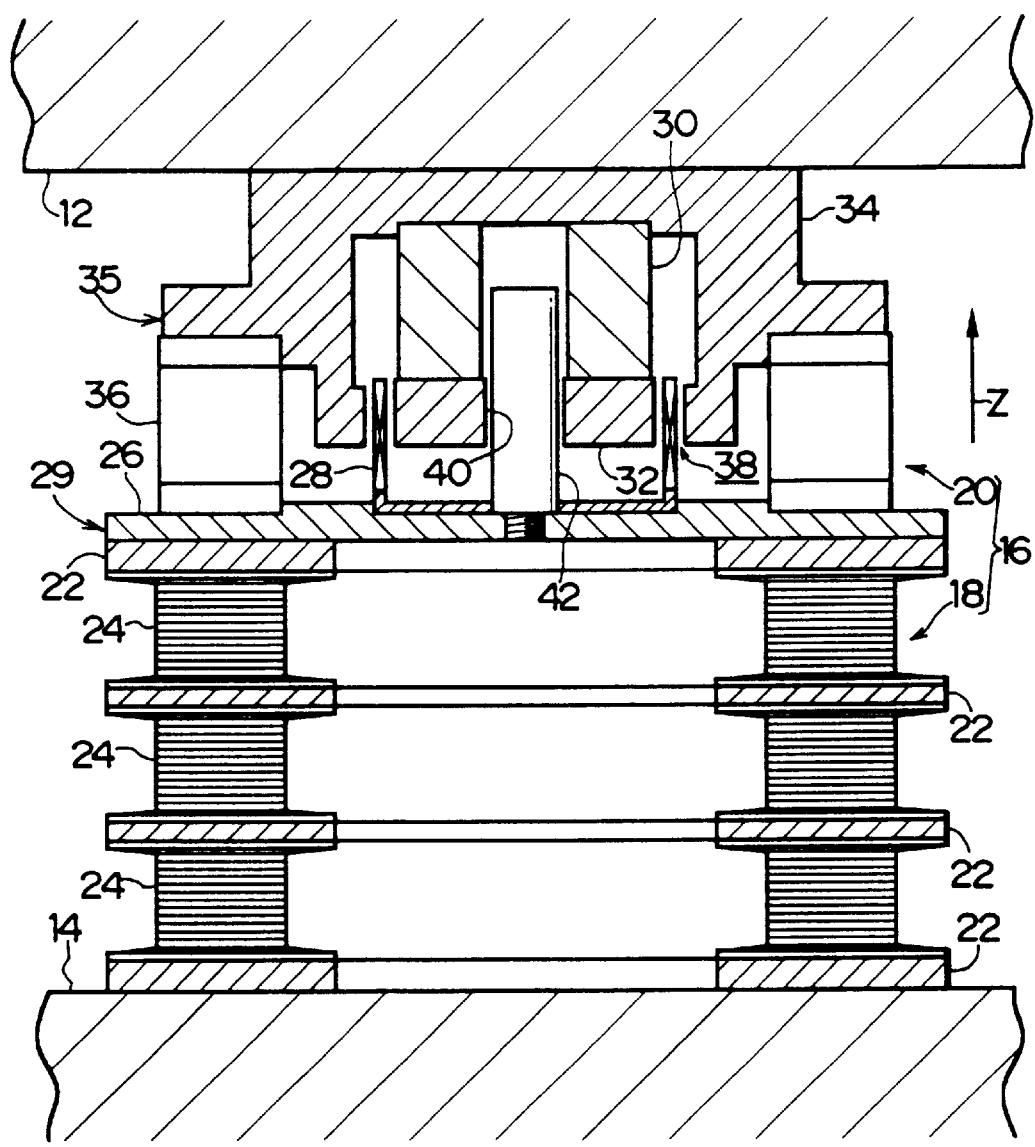
FIG. 2 is a vertical cross-sectional view of a vertical-direction damping apparatus.

As shown in FIG. 2, each of the vertical-direction damping apparatus 16 is composed of a vibration isolating unit 18 disposed on the floor 14 and a vertical-direction actuator 20 disposed on the bottom of the vibration elimination table 12.

The vibration isolating unit 18 has a structure in which annular plates 22 and layered rubber blocks 24 serving as a first support means are alternately stacked.

Figure 3:
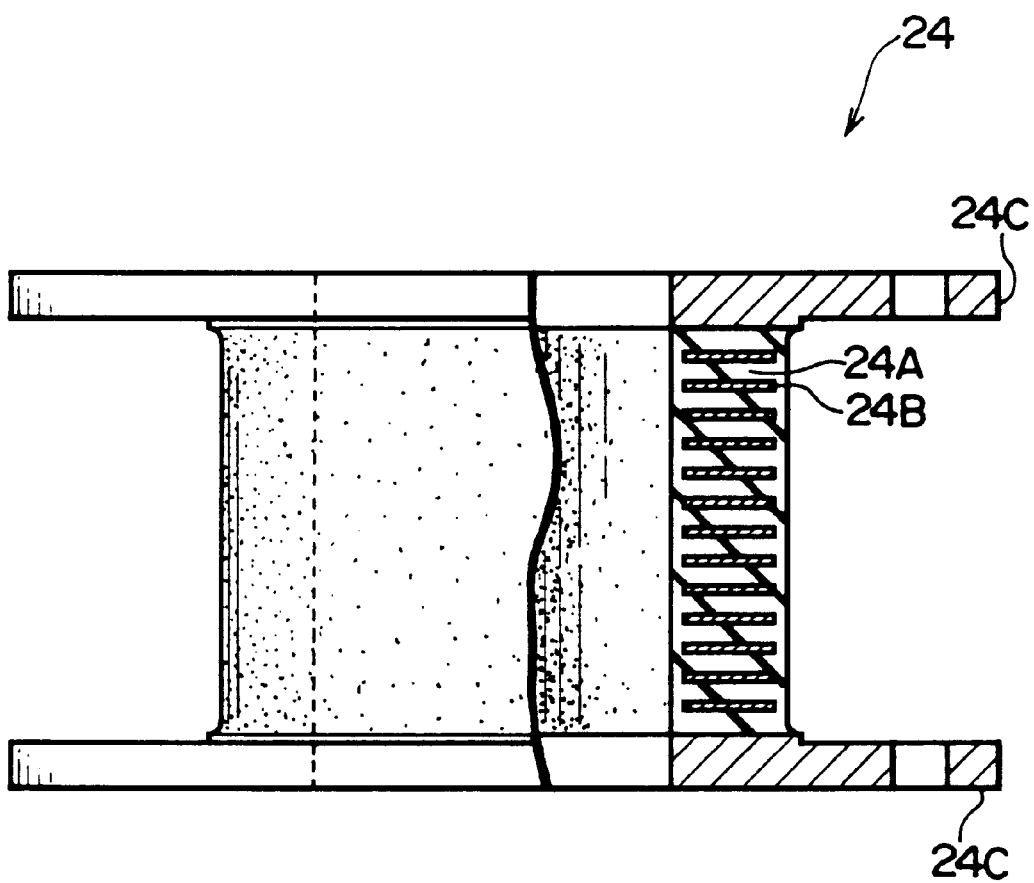
FIG. 3 is a partially sectioned view of a layered rubber body.

As shown in FIG. 3, each of the layered rubber blocks 24 is composed of annular elastic-material layers 24A and annular rigid-material layers 24B which are alternately stacked. Annular mounting plates 24C are fixed to the opposite ends thereof. The rubber block 24 has characteristics such that it is rigid in the axial direction (in the top/bottom direction in FIG. 3) and is flexible in directions perpendicular to the axial direction.

As shown in FIG. 2, the vertical-direction actuator 20 is composed of a coil section 29, a magnet section 35 serving as a magnetic-force-line (magnetic field) generation means, and a plurality of vibration isolating rubber blocks 36 serving as a second support means for supporting the magnet section 35.

The coil section 29 includes a bottom plate 26 and a cylindrical drive coil 28, which is attached to the bottom plate 26 at its center and which serves as an electric conductor.

The magnet section 35 includes an annular permanent magnet 30, an annular pole 32 made of a permeable material, and a pot-shaped yoke 34 made of a permeable material. The magnet section 35 is fixed to the bottom surface of the vibration elimination table 12 with unillustrated bolts such that an air gap 38 faces downward.

The axial directions of the permanent magnet 30 and the drive coil 28 are set to be perpendicular to the floor 14, i.e, in the up/down or vertical direction.

In the magnet section 35, lines of magnetic force pass through the annular air gap 38 between the outer circumferential surface of the pole 32 and the yoke 34, and the drive coil 28 is inserted into the air gap 38 such that it contacts none of the pole 32 and the yoke 34.

In the vertical-direction actuator 20, when a current is caused to flow through the drive coil 28, a force acting in the vertical direction can be produced in the magnet section 35. The drive coil 28 is connected to a controller 44 (see FIG. 1B, not illustrated in FIG. 2).

Each of the vibration isolating rubber blocks 36 is formed of rubber having a columnar shape, so that it is flexible in the vertical direction but is rigid in horizontal directions. In place of the plurality of vibration isolating rubber blocks 36, the magnet section 35 may be supported by a single rubber block having a cylindrical shape that surrounds the drive coil 28.

The above-described structure allows the magnet section 35 to move easily and prevents contact between the magnet section 35 and the coil section 29 when the floor 14 vibrates horizontally. Accordingly, the size of the air gap 38, through which lines of magnetic force (magnetic field) pass, can be reduced over its entire length. This makes it possible to increase the magnetic flux density, so that lines of magnetic force (magnetic field) pass through the drive coil 28 efficiently, resulting in an increase in the generated force.

Moreover, a shaft-shaped stopper 42 oriented upright is provided on the bottom plate 26 and extends into a hole 40 formed in the pole 32 of the magnet 35. When a large external force acts on the vibration elimination table 12 in a horizontal direction so that the magnet section 35 moves horizontally relative to the coil section 29, the stopper 42 prevents the drive coil 28 from contacting the magnet section 35.

As shown in FIGS. 1A and 1B, horizontal-direction damping apparatuses 46 are disposed under the vibration elimination table 12 at the center and opposite longitudinal ends thereof.

Figure 4:
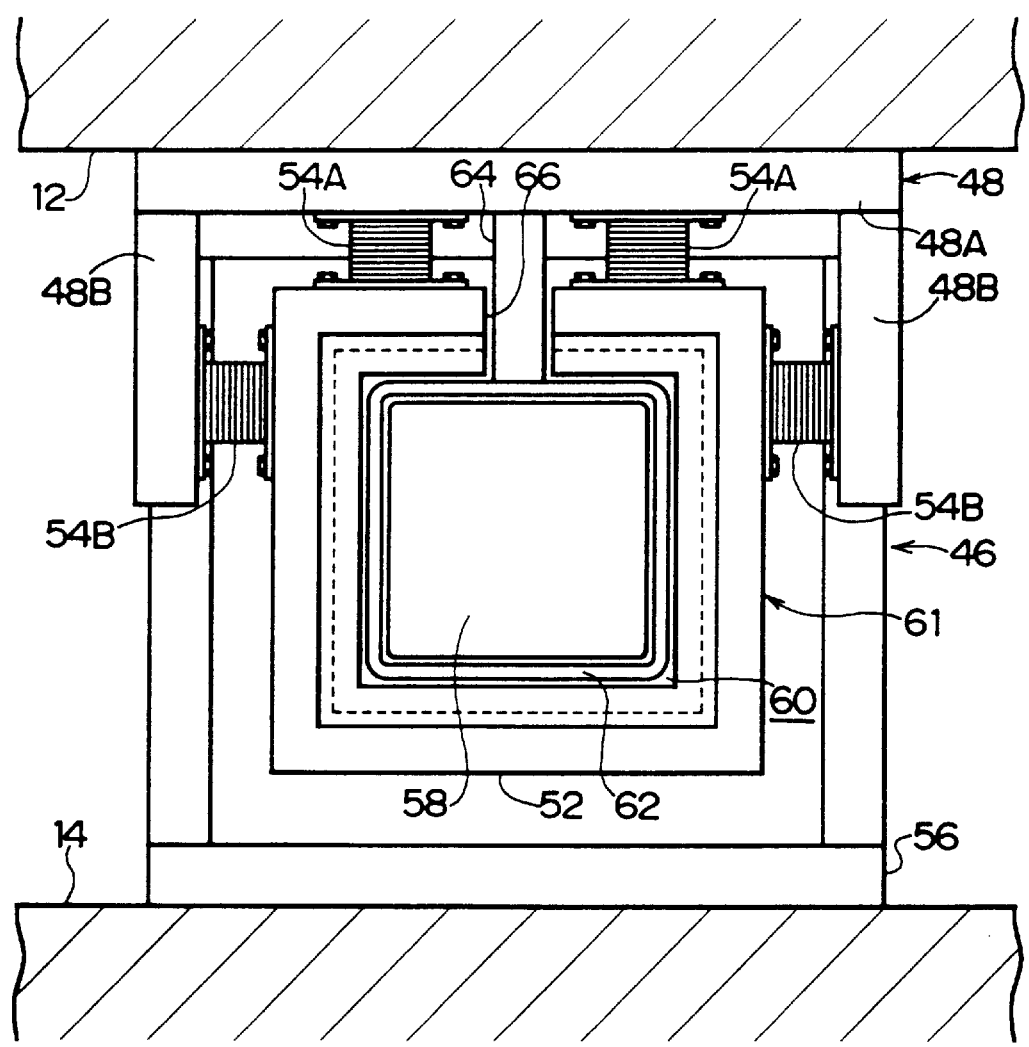
FIG. 4 is a front view of a horizontal-direction damping apparatus.
Figure 5:
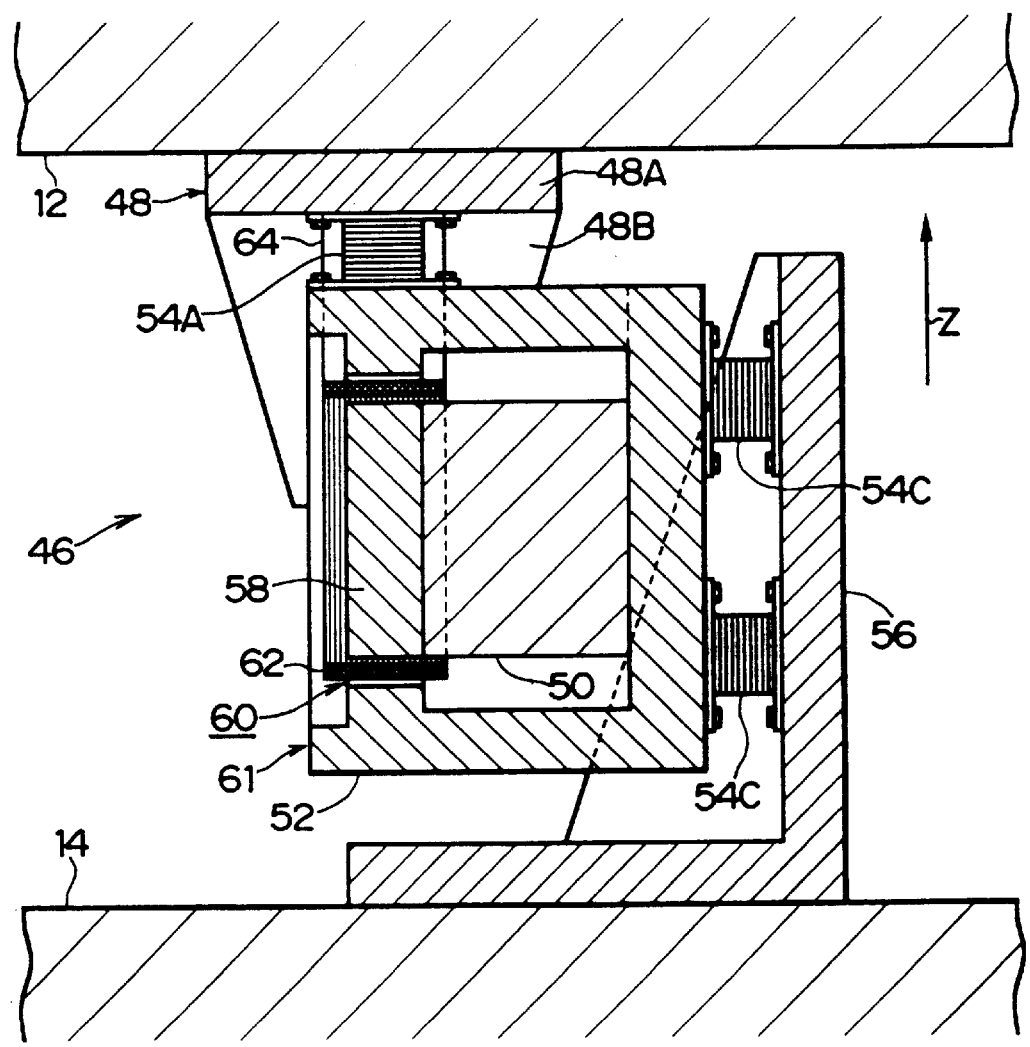
FIG. 5 is a side view of the horizontal-direction damping apparatus.

As shown in FIGS. 4 and 5, each of the horizontal-direction damping apparatuses 46 has a vibration-elimination-table mounting frame 48 attached to the bottom surface of the vibration elimination table 12. The vibration-elimination-table mounting frame 48 has a base portion 48A to be attached to the bottom surface of the vibration elimination table 12 and a pair of side plates 48B which extend downward from opposite ends of the base portion 48A. The base portion 48A and the side plates 48B form a generally C-like shape.

Disposed between the side plates 48B is a pot-shaped yoke 52, which has a prism-shaped permanent magnet 50 at its center. A prism-shaped pole 58 made of a permeable material is fixed to the tip end of the permanent magnet 50, so that lines of magnetic force pass through an air gap 60 formed between the outer circumferential surface of the pole 58 and the yoke 52. A drive coil 62 wound in a rectangular shape is inserted into the air gap 60 such that it contacts neither the pole 58 nor the yoke 52. The yoke 52, the permanent magnet 50, and the pole 58 constitute a magnet section 61. The axial direction of the drive coil 62 and that of the magnet section 61 are set to be parallel to the floor 14, i.e, in a horizontal direction.

The magnet section 61 is connected to the vibration-elimination-table mounting frame 48 via layered rubber blocks 54A and 54B which are respectively attached to the upper and side faces of the magnet section 61 and which serve as a second support means. Therefore, with respect to the vibration elimination table 12, the magnet section 61 moves little in the vertical direction and in the horizontal direction perpendicular to the axial direction of the magnet section 61 but can move flexibly in the axial direction of the magnet section 61.

Moreover, as shown in FIG. 5, the magnet section 61 is connected to a floor mounting frame 56 fixed to the floor 14 via layered rubber blocks 54C that are attached to the back surface of the magnet section 61 and that serve as a first support means. Therefore, with respect to the floor 14, the Dragnet section 61 moves little in the axial direction of the magnet section 61 but can move flexibly in the vertical direction and in the horizontal direction perpendicular to the axial direction of the magnet section 61.

The drive coil 62 is fixed to the base portion 48A of the vibration-elimination-table mounting frame 48 via a support member 64 made of an insulating material. Also, a slit 66 is formed in the yoke 52 of the magnet section 61 so that the support member 64 is received therein without causing interference.

In the present embodiment, since the magnet section 61 is supported by the layered rubber blocks 54A and 54B such that with respect to the vibration elimination table 12, the magnet section 61 moves little in the vertical direction and in the horizontal direction perpendicular to the axial direction of the magnet section 35, the size of the air gap 60 through which lines of magnetic force pass can be reduced over its entire length. This makes it possible to increase the magnetic flux density, so that lines of magnetic force pass through the drive coil 62 efficiently, resulting in an increase in the generated force.

As shown in FIG. 1A, the horizontal-direction damping apparatus 46 at the center is oriented such that it generates forces in the direction of arrow X and in the opposite direction, whereas the horizontal-direction damping apparatus 46 at the opposite ends are oriented such that they generate forces in the direction of arrow Y and in the opposite direction.

As shown in FIGS. 1A and 1B, vibration detectors 68 are attached to three corners of the vibration elimination table 12. The first vibration detector detects vibrations in the direction of arrow X and in the opposite direction (see FIG. 1A), the second vibration detector detects vibrations in the direction of arrow Y and in the opposite direction (see FIG. 1A), and the third vibration detector detects vibrations in the direction of arrow Z and in the opposite direction (vibrations in the vertical direction) (see FIG. 1B). Vibration detection signals output from the vibration detectors are fed to the controlling device 44.

The controlling device 44 inputs the vibration detection signals for calculation and supplies current to the drive coil 28 of the vertical-direction damping apparatus 16 and to the drive coil 62 of the horizontal-direction damping apparatus 46 in order to damp the vibration elimination table 12.

Next, the operation of the present embodiment will be described.

When vibration causes the floor 14 to move by a very small amount in, for example, the direction of arrow Z, the vibration elimination table 12 is apt to move in the direction of arrow Z. However, when the vibration elimination table 12 starts moving in the direction of arrow Z, its acceleration is detected by the corresponding vibration detector 68. Upon reception of a vibration detection signal from the vibration detector 68, the controlling device 44 supplies a current to the drive coil 28 of the vertical-direction actuator 20 such that the acceleration of the vibration elimination table 12 becomes zero. That is, since the vibration elimination table 12 receives, from the drive coil 28 to which the current is supplied, a force acting in the direction opposite to the direction of arrow Z, the displacement of the vibration elimination table 12 in the direction of arrow Z is suppressed. When the floor 14 moves by a very small amount in the direction opposite to the direction of arrow Z, the vertical displacement of the vibration elimination table 12 is suppressed in a similar manner, so that the vibration elimination table 12 does not move in the vertical direction even when the floor 14 vibrates in the vertical direction.

When vibration causes the floor 14 to move by a very small amount in the direction of arrow Y, the vibration elimination table 12 is apt to move in the direction of arrow Y. However, when the vibration elimination table 12 starts moving in the direction of arrow Y, its acceleration is detected by the corresponding vibration detector 68. Upon reception of a vibration detection signal from the vibration detector 68, the controlling device 44 supplies a current to the drive coils 62 of the horizontal-direction damping apparatus 46 such that the acceleration of the vibration elimination table 12 becomes zero. That is, since the vibration elimination table 12 receives, from the drive coils 62 to which the current is supplied, a force acting in the direction opposite to the direction of arrow Y, the displacement of the vibration elimination table 12 in the direction of arrow Y is suppressed. When the floor 14 moves by a very small amount in the direction opposite to the direction of arrow Y, the vertical displacement of the vibration elimination table 12 is suppressed in a similar manner.

When vibration causes the floor 14 to move by a very small amount in the direction of arrow X or in the direction opposite to the direction of arrow X, the displacement of the vibration elimination table 12 is suppressed in a similar manner. Accordingly, the vibration elimination table 12 does not move horizontally, even when the floor 14 vibrates slightly in any horizontal direction.

Moreover, it is possible to detect oscillations of the vibration elimination table 12 in the circumferential direction (in the direction of arrow R in FIG. 1A) using the plurality of vibration detectors 68 and to control the horizontal-direction damping apparatuses 46 located at the opposite longitudinal ends of the vibration elimination table 12 so as to damp the vibration elimination table 12 in the circumferential direction.

As described above, in the vertical-direction damping apparatus 16 of the present embodiment, since the magnet section 35 is supported by the vibration isolating rubber blocks 36 that are flexible in the vertical direction but rigid in horizontal directions, the air gap 38 of the magnet section 35 can be narrowed over its entire length, so that a larger force can be generated in order to damp the vibration elimination table 12 while preventing the magnetic flux density from decreasing. Moreover, since the horizontal vibration of the floor 14 can be isolated by the layered rubber blocks 24, it becomes possible to prevent the horizontal vibration of the floor 14 from transmitting to the vibration elimination table 12 via the vertical-direction damping apparatus 16.

Also, in the horizontal-direction damping apparatuses 46 of the present embodiment, the magnet section 61 is connected, via the layered rubber blocks 54A and 54B, to the vibration-elimination-table mounting frame 48 to which the drive coil 62 is attached, such that the magnet 61 is supported to be flexible in the direction of generation of force but rigid in directions perpendicular to the direction of generation of the force. Accordingly, the air gap 60 can be narrowed over its entire length, so that a larger force can be generated in order to damp the vibration elimination table 12 while preventing the magnetic flux density from decreasing. Moreover, since the vertical vibration of the floor 14 can be isolated by the layered rubber blocks 54C, it becomes possible to prevent the vertical vibration of the floor 14 from transmitting to the vibration elimination table 12 via the horizontal-direction damping apparatus 46.

Second embodiment:

A second embodiment of the present invention will be described with reference to FIGS. 6 and 7. It is to be noted that structural components that are identical with those of the previously-described embodiments are denoted by identical symbols, and descriptions therefor will be omitted.

Figure 6:
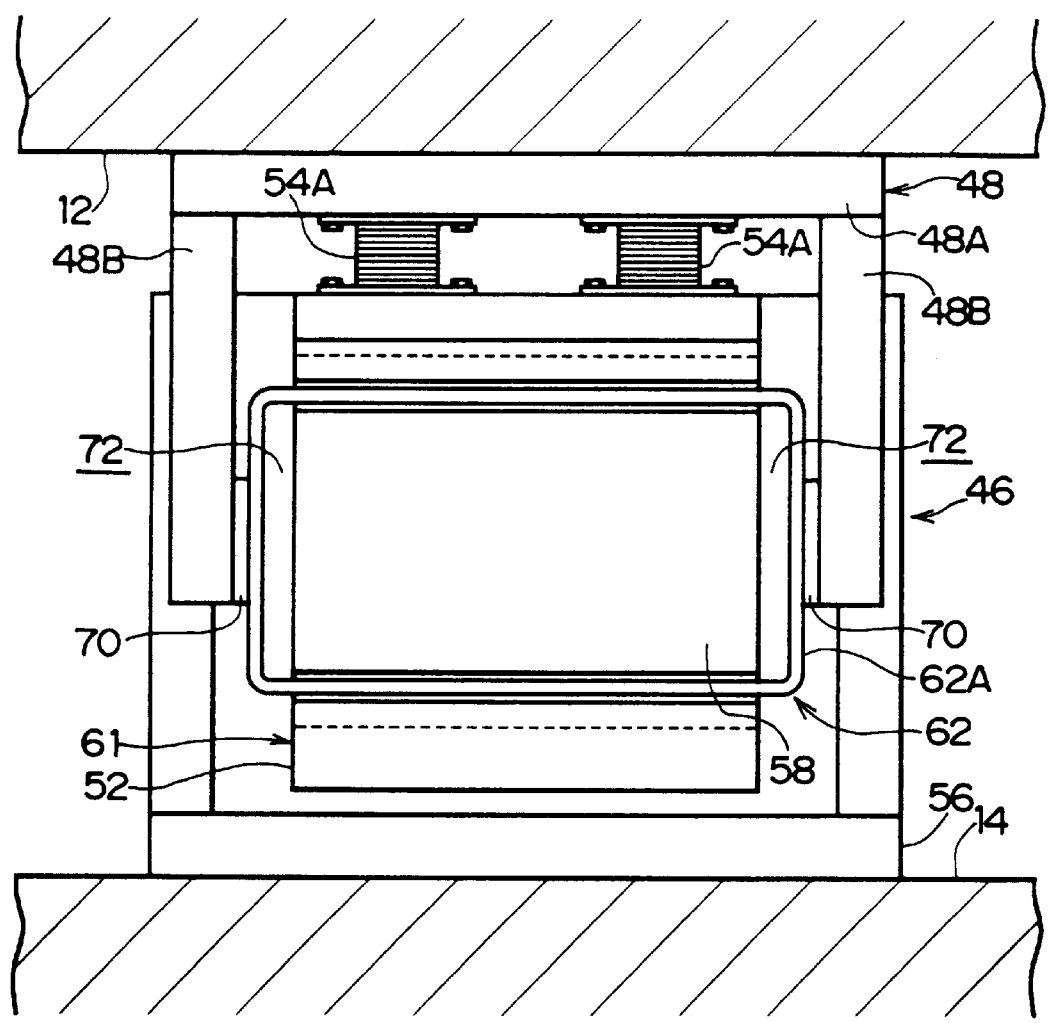
FIG. 6 is a front view of a horizontal-direction damping apparatus according to a second embodiment of the present invention.

As shown in FIG. 6, the drive coil 62 of the horizontal-direction damping apparatus 46 of the present embodiment has an overall width greater than that of the first embodiment. The drive coil 62 is fixed to the side plates 48B of the vibration-elimination-table mounting frame 48 via a spacer 70 made of an insulating material.

Figure 7:
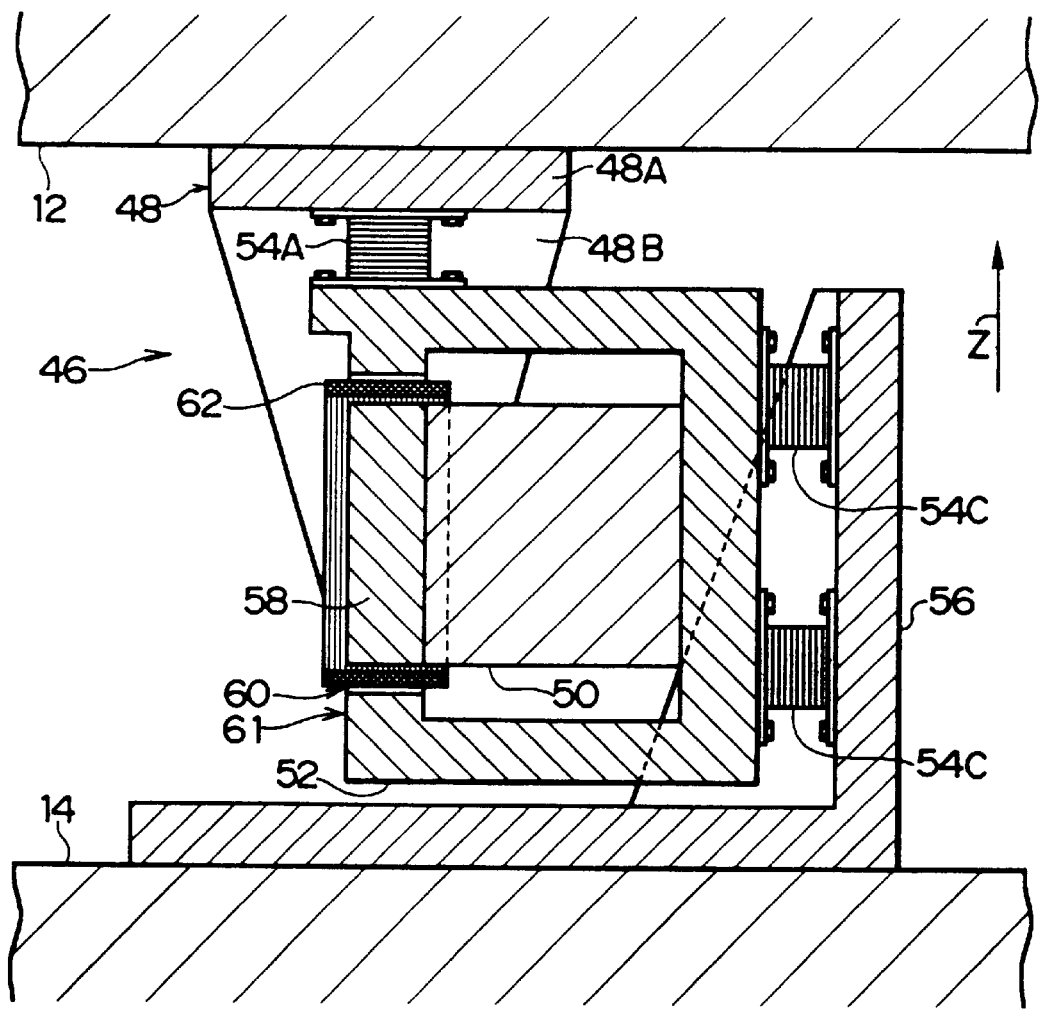
FIG. 7 is a side view of the horizontal-direction damping apparatus according to the second embodiment of the present invention.

As shown in FIG. 7, in the present embodiment, the yoke 52 of the magnet section 61 is formed in a generally C-like shape, so that there are formed only air gaps 60 that extend horizontally.

In the present embodiment, the yoke 52 is connected to the base portion 48A of the vibration-elimination-table mounting frame 48 via the layered rubber blocks 54A only.

Although in the present embodiment the distance between the side plates 48B of the vibration-elimination-table mounting frame 48 is the same as that in the first embodiment, the width of the yoke 52 of the present invention is larger than that in the first embodiment, because the layered rubber blocks 54B for supporting the side faces of the yoke 52 are not provided.

In the present embodiment, a clearance 72 of a predetermined size is formed between each vertical portion 62A of the drive coil 62 and the corresponding side surface of the pole 58. Accordingly, even when a large external force acts on the vibration elimination table 12 in the widthwise direction perpendicular to the axis of the drive coil 62, movement of the vibration elimination table 12 can be absorbed by the clearance.

Moreover, since the width of the yoke 52 can be increased by an amount corresponding to the length of the layered rubber blocks 54B which are used in the first embodiment to support the side surfaces of the yoke 52, the overall length of the air gaps 60 in which lines of magnetic force pass through the drive coil 62 becomes the same as in the first embodiment, even though only the horizontally extending air gaps 60 are provided. Accordingly, the horizontal-direction damping apparatus 46 of the present embodiment has the same outer size as that of the first embodiment and can generate the same drive force as that in the first embodiment.

Other operation and effects are the same as those of the first embodiment.

Third embodiment:

A third embodiment of the present invention will be described with reference to FIG. 8. It is to be noted that structural components that are identical with those of the previously-described embodiments are denoted by identical symbols, and descriptions therefor will be omitted.

Figure 8:
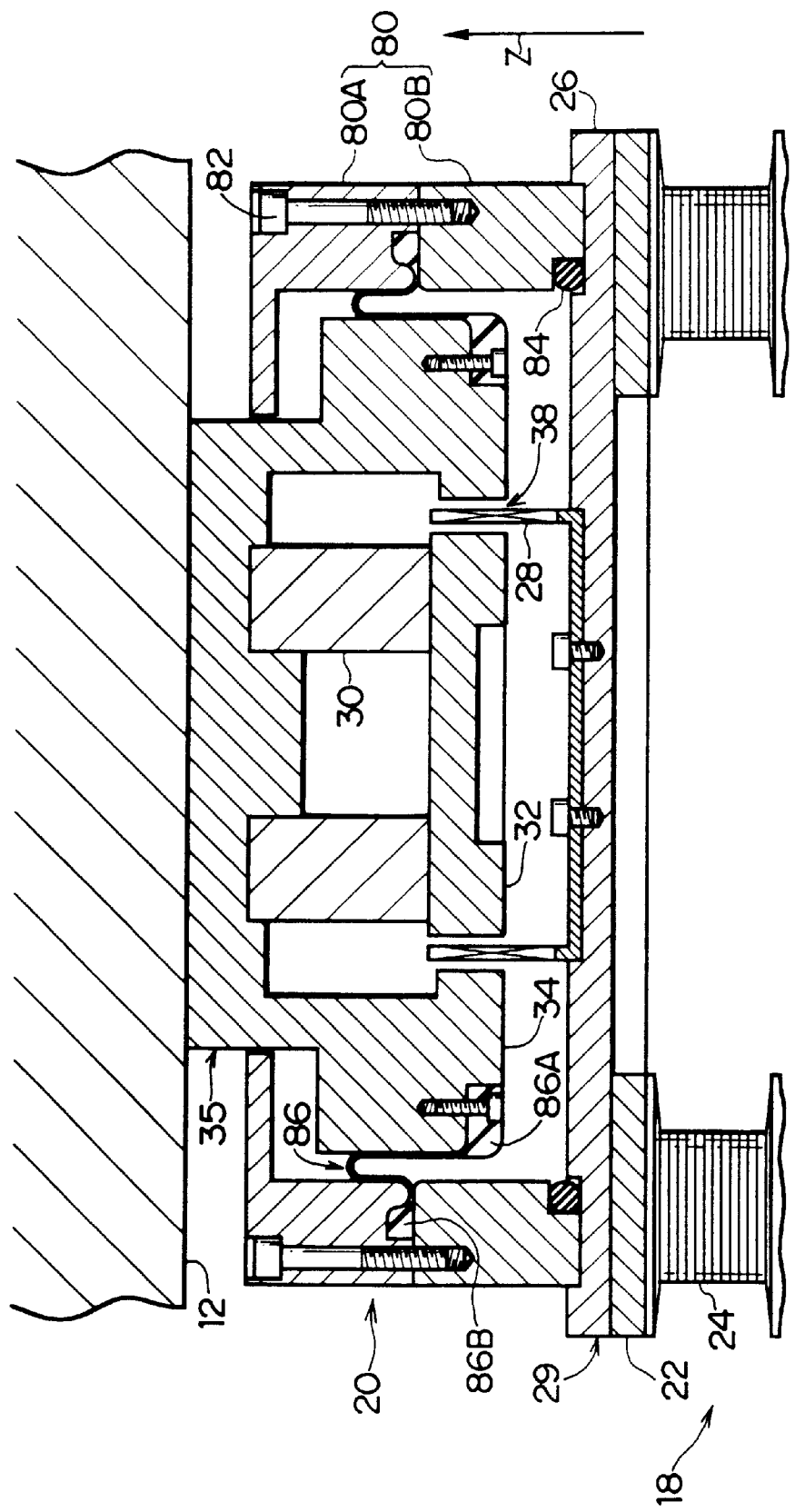
FIG. 8 is a vertical cross-sectional view of a vertical-direction damping apparatus according to a third embodiment of the present invention.

As shown in FIG. 8, in the vertical-direction actuator 20 of the present embodiment, an outer cylinder 80 is fixed to the bottom plate 26 such that its axis is oriented in the vertical direction. The outer cylinder 80 is axially divided into upper and lower cylinders 80A and 80B, which are connected with each other with bolts 82. The lower cylinder 80B is in close contact with the bottom plate 26, and an O-ring 84 is disposed for forming a seal between the lower cylinder 80B and the bottom plate 26.

A magnet section 35 is inserted into the outer cylinder 80 to be coaxial therewith, with a predetermined clearance being formed between the magnet section 35 and the outer cylinder 80.

An inner thicker portion 86A of an annular rolling seal 86 made of an elastic material is closely fixed to the outer circumferential edge of the bottom surface of the yoke 34 of the magnet portion 35. The radially intermediate portion of the rolling seal 86 has a smaller thickness, and the rolling seal 86 is bent in a generally U-like shape. The outer thicker portion 86B of the rolling seal 86 is held between the upper cylinder 80A and the lower cylinder 80B.

In the present embodiment, air is charged into the internal space defined by the yoke 34, the rolling seal 86, the outer cylinder 80, and the bottom plate 26 in order to constitute an air spring. As compared to the case where the vibration isolating rubber blocks 36 are employed, the air spring of the above-described rolling seal type has a higher flexibility in the axial direction (up/down direction in FIG. 8) and has a higher spring constant in the horizontal direction. Accordingly, the relative horizontal displacement between the drive coil 28 and the magnet section 35 can be suppressed to a lower level compared to the relative displacement between the vibration elimination table 12 and the floor 14. In addition, interference between the drive coil 28 and the magnet section 35 can be prevented. In the present invention, since the spring constant in the horizontal direction can be increased, the stoppers 42 may be omitted.

Other operation and effects are the same as those of the first embodiment.

Fourth embodiment:

A fourth embodiment of the present invention will be described with reference to FIGS. 9 and 10. It is to be noted that structural components that are identical with those of the previously-described embodiments are denoted by identical symbols, and descriptions therefor will be omitted.

Figure 9:
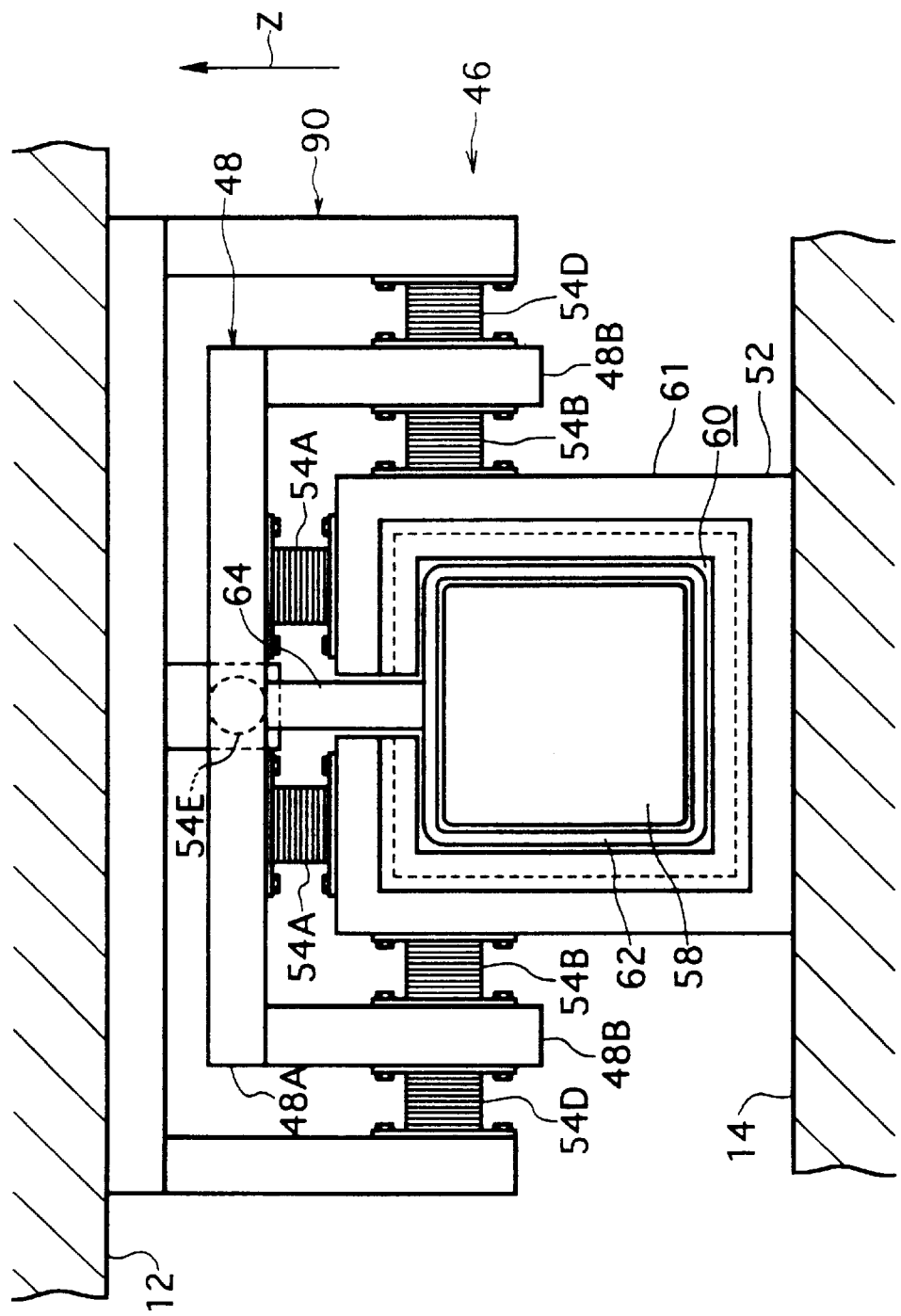
FIG. 9 is a front view of a horizontal-direction damping apparatus according to a fourth embodiment of the present invention.
Figure 10:
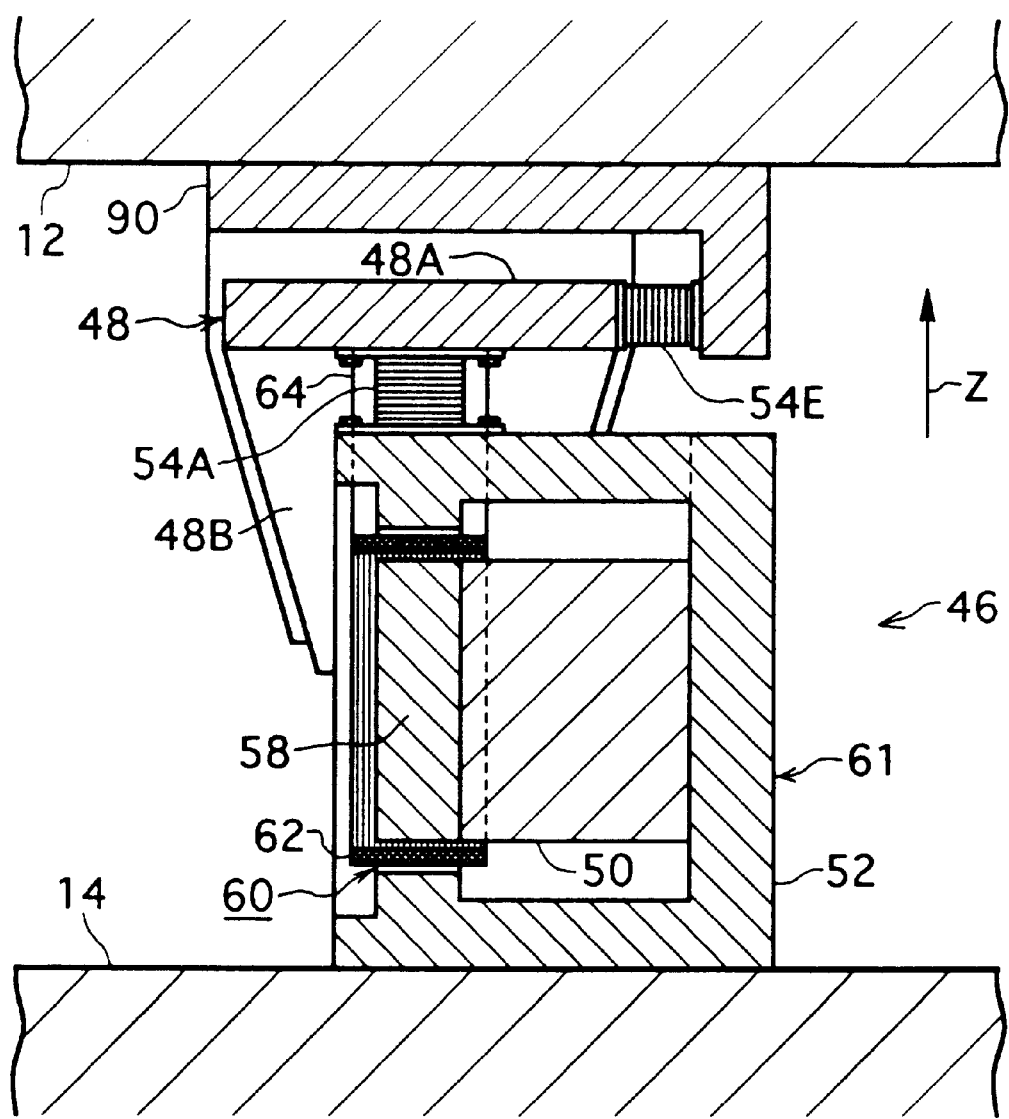
FIG. 10 is a side view of the horizontal-direction damping apparatus according to the fourth embodiment of the present invention.

As shown in FIGS. 9 and 10, in the present embodiment, the yoke 52 is fixed to the floor 14.

A frame 90 is attached to the bottom surface of the vibration elimination table 12. As shown in FIG. 9, layered rubber blocks 54D are attached to the outside surfaces of the side plates 48B of the vibration-elimination-table mounting frame 48, and as shown in FIG. 10, layered rubber blocks 54E are attached to the end surface of the base portion 48A of the vibration-elimination-table mounting frame 48. The vibration-elimination-table mounting frame 48 is attached to the frame 90 via these layered rubber blocks 54D and 54E.

In the present embodiment, since the vibration-elimination-table mounting frame 48 is attached to the frame 90 of the vibration elimination table 12 via these layered rubber blocks 54D and 54E, it is possible to apply a damping force to the vibration elimination table 12 and to prevent vertical vibrations of the floor 14 from transmitting to the vibration elimination table 12 via the horizontal-direction damping apparatuses 46.

While the embodiments of the present invention, as herein disclosed, constitute a preferred form, it is to be understood that other forms might be adopted.

What is claimed is:

1. A damping apparatus comprising:

magnetic-force-line generation means connected to one of a vibration generation section and a vibration reception section and having an air gap through which lines of magnetic force pass in a direction intersecting a predetermined vibration direction;

an electric conductor connected to the other of said vibration generation section and said vibration reception section and disposed within the air gap such that when a predetermined current flows through said electric conductor, a force is generated in one of opposite directions along an axis that extends in the vibration direction;

first support means disposed at least between one of said vibration generation section and said vibration reception section and said magnetic-force-line generation means or between the other of said vibration generation section and said vibration reception section and said electric conductor, said first support means being flexible in directions intersecting the directions of the axis but rigid in the directions of the axis; and second support means disposed between said electric conductor and said magnetic-force-line generation means, said second support means being flexible in the directions of the axis but rigid in directions intersecting the directions of the axis.

2. A damping apparatus according to claim 1, wherein each of said first and second support means includes a layered body composed of elastic material layers and rigid material layers alternately layered.

3. A damping apparatus according to claim 1, wherein when the directions of the axis is vertical, said first support means includes a layered body composed of elastic material layers and rigid material layers that are alternately layered in the vertical direction, and said second support means is composed of a vibration isolating rubber block that is flexible in the vertical direction but rigid in horizontal directions.

4. A damping apparatus according to claim 1, wherein when the directions of the axis is vertical, said first support means includes a layered body composed of elastic material layers and rigid material layers that are alternately layered in the vertical direction, and said second support means is composed of a rolling seal type air spring.

5. A damping apparatus according to claim 1, wherein said electric conductor is a drive coil; said magnetic-force-line generation means includes a permanent magnet, a pole made of a permeable material, and a yoke made of a permeable material; and said air gap is formed between the outer circumferential surface of said pole and said yoke.

6. A damping apparatus according to claim 1, further comprising a stopper for preventing a large relative movement between said electric conductor and said magnetic-force-line generation means in a direction intersecting the directions of the axis.

7. A damping apparatus according to claim 1, further comprising detectors attached to said vibration reception section in order to detect vibrations of said vibration reception section and to output vibration detection signals representing the detected vibrations, and said electric conductor is supplied with said predetermined current in accordance with the vibration detection signals from said vibration detectors in order to damp said vibration reception section.

8. A damping apparatus comprising:

at least one vertical-direction damping apparatus disposed between a vibration generation section and a vibration reception section symmetrically with respect to the center of said vibration reception section and adapted to damp vertical vibration;

at least one first horizontal-direction damping apparatus disposed between said vibration generation section and said vibration reception section symmetrically with respect to the center of said vibration reception section and adapted to damp vibration in a first horizontal direction;

at least one second horizontal-direction damping apparatus disposed between said vibration generation section and said vibration reception section symmetrically with respect to the center of the vibration reception section and adapted to damp vibration in a second horizontal direction perpendicular to the first horizontal direction;

vibration detectors provided on said vibration reception section and adapted to detect vibrations of said vibration reception section and to output vibration detection signals representing the detected vibrations; and a controlling device for controlling said vertical-direction damping apparatus and said first and second horizontal-direction damping apparatuses in accordance with the vibration detection signals from said vibration detectors;

wherein each of said vertical-direction damping apparatus and said first and second horizontal-direction damping apparatuses comprises:

magnetic-force-line generation means connected to one of said vibration generation section and said vibration reception section and having an air gap through which lines of magnetic force pass in a direction intersecting a predetermined vibration direction;

an electric conductor connected to the other of said vibration generation section and said vibration reception section and disposed within the air gap such that when a predetermined current flows through the electric conductor, a force is generated in one of opposite directions along an axis that extends in the vibration direction;

first support means disposed at least between one of said vibration generation section and said vibration reception section and said magnetic-force-line generation means or between the other of said vibration generation section and said vibration reception section and said electric conductor, said first support means being flexible in directions intersecting the directions of the axis but rigid in the directions of the axis; and second support means disposed between said electric conductor and said magnetic-force-line generation means, said second support means being flexible in the directions of the axis but rigid in directions intersecting the directions of the axis.

9. A damping apparatus according to claim 8, wherein said electric conductor is a drive coil; said magnetic-force-line generation means includes a permanent magnet, a pole made of a permeable material, and a yoke made of a permeable material; and said air gap is formed between the outer circumferential surface of said pole and said yoke.

10. A damping apparatus according to claim 8, wherein in said vertical-direction damping apparatus, said magnetic-force-line generation means is attached to said vibration reception section; said electric conductor is attached to said vibration generation section via a layered body that is rigid in the vertical direction but flexible in horizontal directions, said layered body being composed of elastic material layers and rigid material layers alternately layered and serving as said first support means; and said magnetic-force-line generation means and said electric conductor are connected with each other via a vibration isolating rubber block that serves as said second support means and that is flexible in the vertical direction but rigid in horizontal directions.

11. A damping apparatus according to claim 10, further comprising a stopper for preventing a large relative movement between said electric conductor and said magnetic-force-line generation means in a direction intersecting the direction of the axis.

12. A damping apparatus according to claim 10, wherein said electric conductor is a drive coil; said magnetic-force-line generation means includes a permanent magnet, a pole made of a permeable material, and a yoke made of a permeable material; and said air gap is formed between the outer circumferential surface of said pole and said yoke.

13. A damping apparatus according to claim 8, wherein in said vertical-direction damping apparatus, said magnetic-force-line generation means is attached to said vibration reception section; said electric conductor is attached to said vibration generation section via a layered body that is rigid in the vertical direction but flexible in the horizontal direction, said layered body being composed of elastic material layers and rigid material layers alternately layered and serving as said first support means; and said magnetic-force-line generation means and said electric conductor face each other via a rolling seal type air spring that serves as said second support means and that is flexible in the vertical direction but rigid in horizontal directions.

14. A damping apparatus according to claim 13, wherein said electric conductor is a drive coil; said magnetic-force-line generation means includes a permanent magnet, a pole made of a permeable material, and a yoke made of a permeable material; and said air gap is formed between the outer circumferential surface of said pole and said yoke.

15. A damping apparatus according to claim 8, wherein in said first horizontal-direction damping apparatus, said electric conductor is attached to said vibration reception section; said magnetic-force-line generation means is attached to said vibration generation section via a first layered body that is rigid in the first horizontal direction but flexible in the second horizontal direction and in the vertical direction, said first layered body being composed of elastic material layers and rigid material layers alternately layered and serving as said first support means; and said magnetic-force-line generation means is connected to said vibration reception section via a second layered body that is flexible in the first horizontal direction but rigid in the second horizontal direction and in the vertical direction, said second layered body being composed of elastic material layers and rigid material layers alternately layered and serving as said second support means.

16. A damping apparatus according to claim 15, wherein said electric conductor is a drive coil; said magnetic-force-line generation means includes a permanent magnet, a pole made of a permeable material, and a yoke made of a permeable material; and said air gap is formed between the outer circumferential surface of said pole and said yoke.

17. A damping apparatus according to claim 8, wherein in said second horizontal-direction damping apparatus, said electric conductor is attached to said vibration reception section; said magnetic-force-line generation means is attached to said vibration generation section via a first layered body that is rigid in the second horizontal direction but flexible in the first horizontal direction and in the vertical direction, said first layered body being composed of elastic material layers and rigid material layers alternately layered and serving as said first support means; and said magnetic-force-line generation means is connected to said vibration reception section via a second layered body that is flexible in the second horizontal direction but rigid in the first horizontal direction and in the vertical direction, said second layered body being composed of elastic material layers and rigid material layers alternately layered and serving as said second support means.

18. A damping apparatus according to claim 17, wherein said electric conductor is a drive coil; said magnetic-force-line generation means includes a permanent magnet, a pole made of a permeable material, and a yoke made of a permeable material; and said air gap is formed between the outer circumferential surface of said pole and said yoke.

19. A damping apparatus according to claim 8, wherein said vibration detectors include a first vibration detector for detecting vibration in the vertical direction, a second vibration detector for detecting vibration in the first horizontal direction, and a third vibration detector for detecting vibration in the second horizontal direction.

20. A damping apparatus according to claim 19, wherein said controlling device controls said vertical-direction damping apparatus in accordance with the vibration detection signal from said first vibration detector, controls said first horizontal-direction damping apparatus in accordance with the vibration detection signal from said second vibration detector, and controls said second horizontal-direction damping apparatus in accordance with the vibration detection signal from said third vibration detector.

* * * * *